United States Patent [19]

Suzuki et al.

[11] Patent Number: 5,079,326

[45] Date of Patent: Jan. 7, 1992

[54] THERMOSETTING RESIN AND A METHOD FOR PRODUCING IT

[75] Inventors: Toshio Suzuki; Teruhiko Ohnuma; Osamu Suzuki; Satoshi Amano; Yasuo Imashiro, all of Tokyo, Japan

[73] Assignee: Nisshinbo Industries, Inc., Tokyo, Japan

[21] Appl. No.: 225,598

[22] Filed: Jul. 26, 1988

Related U.S. Application Data

[63] Continuation of Ser. No. 846,123, Mar. 31, 1986, abandoned.

[30] Foreign Application Priority Data

| Mar. 29, 1985 [JP] | Japan | 60-66195 |
| Apr. 12, 1985 [JP] | Japan | 60-76656 |
| Apr. 25, 1985 [JP] | Japan | 60-87460 |
| May 22, 1985 [JP] | Japan | 60-108359 |
| Jun. 28, 1985 [JP] | Japan | 60-140491 |

[51] Int. Cl.⁵ ............ C08G 18/02; C08G 18/06; C08G 18/58; C08G 18/54
[52] U.S. Cl. ................... 528/53; 528/57; 528/67; 528/68; 528/73; 525/452; 525/453; 525/504; 525/528; 521/901
[58] Field of Search ............ 528/53, 57, 67, 68, 528/73; 525/504, 528, 452, 453; 521/901

[56] References Cited

U.S. PATENT DOCUMENTS

| 3,619,338 | 11/1971 | Gilman et al. | 528/69 |
| 3,723,366 | 3/1973 | Kan | 521/901 |
| 3,736,298 | 5/1973 | Schmit et al. | 528/57 |
| 3,766,103 | 10/1973 | Patton et al. | 528/53 |
| 3,849,349 | 11/1974 | Frisch et al. | 528/53 |
| 3,891,578 | 6/1975 | Kan et al. | 521/901 |
| 3,941,726 | 3/1976 | Widermann et al. | 528/67 |
| 4,051,082 | 9/1977 | Cenker et al. | 521/902 |
| 4,054,546 | 10/1977 | Narayan et al. | 521/902 |
| 4,174,433 | 11/1979 | Schafer et al. | 528/68 |
| 4,195,132 | 3/1980 | Sundermann et al. | 528/53 |
| 4,248,978 | 2/1981 | de Clear et al. | 525/504 |
| 4,311,815 | 1/1982 | Heine | 525/504 |
| 4,424,288 | 1/1984 | Patton, Jr. et al. | 521/902 |
| 4,426,461 | 1/1984 | Smith | 521/116 |
| 4,542,165 | 9/1985 | Kumata et al. | 528/53 |
| 4,966,948 | 10/1990 | Godbey, Jr. et al. | 525/453 |

*Primary Examiner*—John Kight, III
*Assistant Examiner*—Robon Sergent
*Attorney, Agent, or Firm*—Burns, Doane, Swecker & Mathis

[57] ABSTRACT

The present invention relates to a thermosetting resin having high thermal resistance, high strength, flame resistance, and good processability which can be obtained by reacting polycarbodiimide substantially produced form one or more kinds of organic polyisocyanate with crosslinking agents having two or more active hydrogen groups in their molecules, one or more kinds of compounds having epoxy groups in their molecules or compounds capable of accelerating the trimerization reaction of carbodiimide, and production methods thereof.

27 Claims, No Drawings ated by the inventors of the present invention (refer to Japanese Patent Laid-Open No. 41320/1984). However, it is

THERMOSETTING RESIN AND A METHOD FOR PRODUCING IT

This application is a continuation of application Ser. No. 846,123, filed Mar. 31, 1986, now abandoned.

BACKGROUND OF THE INVENTION

1. Field of the Invention

The present invention relates to a novel thermosetting resin having thermal resistance, flame resistance, high strength, and excellent processability, and production methods thereof.

2. Description of the Prior Art

In general, an addition polymerization of an organic polyisocyanate and a compound having active hydrogen groups has been known, as represented by the production of useful polymeric substances which are known generically as polyurethane in various combinations of reactions between such compounds. For example, the reaction of organic polyisocyanate with a polyhydric alcohol produces polyurethane, while its reaction with a polyamine produces polyurea, etc.

However, even if compounds have active hydrogen groups, aminotriazine, for example, has the free amino group directly bonded to the triazine nucleus with very high electron attractive property, and thus its reaction activity with isocyanate are thought to be very low. Furthermore, aminotriazine is usually solid, has a very high melting point, and is almost insoluble in liquid organic polyisocyanates. Consequently, there have so far been very few examples of the production of polymeric substances by the reaction of organic polyisocyanates with aminotriazine and it has been thought that no reaction takes place between these substances. As described above, the actual conditions of this reaction have not yet been completely elucidated.

On the other hand, the inventors of the present invention found during the process of making certain investigations with a view to developing a novel resin with thermal and flame resistance that condensation products which are extremely rigid, insoluble and infusible can be produced by reactions between organic polyisocyanates and aminotriazine, and made an application for patent with regard to this invention (refer to Japanese Patent Laid-Open No. 41320/1984). However, it is thought that if a thermosetting resin with excellent physical properties such as strength can be obtained, the reaction between organic polyisocyanate and a compound having active hydrogen groups will have increased applicability and will be very useful.

Therefore, a primary object of the present invention is to provide a thermosetting resin having high thermal resistance and strength.

Another object of the present invention is to provide a flame resistant thermosetting resin having high thermal resistance and strength.

A further object of the present invention is to provide a thermosetting resin having high thermal resistance, high strength, flame resistance, and excellent processability.

DETAILED DESCRIPTION OF THE INVENTION

The present invention was accomplished for the purpose of providing a thermosetting resin having higher strength, higher thermal resistance and good processability with the above described prior art as its background. The thermosetting resin of the present invention is characterized by being obtained by reacting polycarbodiimide which is substantially produced from one or more organic polyisocyanates by using one or more catalysts for accelerating the carbodiimidization of isocyanates, or a polycarbodiimide substantially produced under molecular weight control from one or more kinds of organic polyisocyanate and organic monoisocyanate by using one or more kinds of catalyst for accelerating the carbodiimidization of isocyanate; with one or more kinds of crosslinking agents having two or more active hydrogen groups in their molecules, one or more kinds of compound having an epoxy group in the molecules, or one or more kinds of compound capable of accelerating the trimerization of carbodiimide. The production method is characterized by reacting one or more kinds of organic polyisocyanate, one or more kinds of crosslinking agent having two or more active hydrogen groups in the molecules, one or more kinds of compounds having epoxy groups in the molecules, or compounds capable of accelerating the trimerization of carbodiimide, and one or more kinds of catalyst for accelerating the carbodiimidization of isocyanate; or by heating a composition containing one or more kinds of organic monoisocyanate, one or more kinds of crosslinking agent having two or more active hydrogen groups in their molecules, or one or more kinds of compound having epoxy groups in their molecules, or one or more kinds of compound for accelerating the trimerization of carbodiimide, with one or more kinds of catalyst for accelerating the carbodiimidization of isocyanate at a suitable temperature.

The present invention will be described in detail hereinafter. The polycarbodiimide obtained by using the organic monoisocyanates under molecular weight control is also referred to hereinafter as the organic polycarbodiimide.

The invention to which the above described prior invention by the inventors of the present invention relates discloses that a mixture of the organic polyisocyanate and aminotriazine is heated at a temperature above 60° C. to obtain a curable resin and that this curable resin is heated at a temperature above 300° C. to obtain a resin having high thermal resistance and flame resistance.

As a result of the further investigations undertaken, the inventors have found that the polycarbodiimide obtained from the organic polyisocyanate was crosslinked by substances having at least two active hydrogen groups in their molecules, such as aminotriazine compounds, bisimide compounds, and polyhydroxy compounds, thus producing a thermosetting property, and this finding has led to the completion of the present invention.

Namely, the difference between the present invention and the invention to which the prior invention relates is the fact that in the prior invention, a thermosetting resin is obtained by reacting the organic polyisocyanate with aminotriazine under heating, while in the present invention, a novel thermosetting resin is obtained by firstly substantially changing the organic polyisocyanate into polycarbodiimide in the presence of the catalysts and then crosslinking the polycarbodiimide by reacting it with the crosslinking agents having two or more active hydrogen groups in their molecules, the epoxy compounds, or the compounds for accelerating the trimerization of carbodiimide.

It is known that the carbodiimide bond reacts with an active hydrogen compound, and attempts to modify the polycarbodiimide with an active hydrogen compound such as undertaken by E. Dyer, etc. resulted in reports that polytetrazole could be obtained by treating polycarbodiimide with hydrogen azide ($HN_3$) (Journal of Polymer Science 6, 729-742 (1968)). Though this has been already carried out, the substance obtained in such a manner was not the resin of the crosslinked polytetrazole described above, and had poor physical properties, and poor applicability.

The organic polyisocyanate used in the present invention is a compound having two isocyanate end groups, for example, 2,4-tolylene diisocyanate, 2,6-tolylene diisocyanate, a mixture of 2,4 and 2,6-tolylene diisocyanate, crude tolylene diisocyanate, methylenediphenyl diisocyanate, crude methylenediphenyl diisocyanate, 4,4', 4''-triphenylmethylene triisocyanate, 4,4'-dimethyldiphenylmethane-2,2',5,5'-tetraisocyanate, xylene diisocyanate, hexamethylene-1,6-diisocyanate, lysinediisocyanate methylester, hydrogenated methylenediphenyl isocyanate, m-phenylene diisocyanate, napthylene-1,5-diisocyanate, 1-methoxyphenyl-2,4-diisocyanate, 4,4'-biphenyl diisocyanate, 3,3'-dimethoxy-4,4'-biphenyl diisocyanate, 3,3'-dimethyl-4,4'-biphenyl diisocyanate, 3,3'-dimethyldiphenylmethane-4,4'-diisocyanate, and isophorone diisocyanate. A terminal isocyanate prepolymer obtained by using such organic polyisocyanates in a stoichiometrically excess amount of the polyfunctional active hydrogen compound can be used, for example, that made of 4,4'-diphenylmethane diisocyanate, poly-$\epsilon$-caprolactone diol and polytetrahydrofurane ether diol.

Since the object of the present invention is to provide a curable resin with higher thermal resistance, it is undesirable for the resin to contain many aliphatic ester and ether bonds.

The use of a partially carbodiimidized polyisocyanate will not change the substance of the present invention.

The organic monoisocyanates used in the present invention are organic compounds having one isocyanate group in their molecules, which include phenylisocyanate, (ortho, para, meta)-tolylisocyanate, dimethylphenyl isocyanate, cyclohexyl isocyanate, methyl isocyanate, chlorophenyl isocyanate, trifluoromethylphenyl isocyanate, and naphthyl isocyanate, but if thermal resistance is seriously considered, it is preferable to use aromatic isocyanates.

The crosslinking agents which form the next element of the present invention are generally compounds having two or more active hydrogen groups in their molecules, compounds having epoxy groups, or trimerization-accelerating compounds or mixtures thereof, for example, triazine derivatives such as amino-s-triazine, 2-phenyl-4,6-diaminotriazine, 2-methyl-4,6-diaminotriazine, and compounds having phenolic hydroxyl groups such as 3,9-bis[2-(3,5-diamino-2,4,6-triazaphenyl)ethyl]-2,4,8,10-tetraoxaspiro[5,5] undecane, cyanuric acid and its substituted compound, hydroquinone, and 4,4'-isopropylidene diphenol, diimide compounds such as urea, dicyandiamide, and pyromellitic diimide, dicarboxylic acid anhydride such as pyromellitic acid anhydride, and 3,3'-4,4'-benzophenonetetracarboxylic acid anhydride, and polyfunctional epoxy compounds.

It has been found from the results of the investigations by the inventors of the present invention that any trimerization catalyst of organic isocyanate known by those skilled in the art of polyurethane chemistry can be used as the compound capable of accelerating the trimerization of carbodiimide. Particularly, compounds having at least one tertiary nitrogen atom in their molecules such as diazabicycloundecene, p-dimethylaminophenol, and tris(dialkylaminoalkyl)hexahydro-s-triazine, an organic or inorganic acid salt thereof, organometallic salts such as sodium acetate, potassium acetate, and sodium benzoate, or a mixed system of a tertiary amine and an alkylene oxide have effective functions.

The third element of the present invention is the catalyst for accelerating the carbodiimidization of isocyanate. Though various kinds of catalyst can be used, 1-phenyl-2-phospholene-1-oxide, 3-methyl-2-phospholene-1-oxide, 1-phenyl-2-phospholene-1-sulfide, 1-ethyl-2-phospholene-1-oxide, 1-ethyl-3-methyl-2-phospholene-1-oxide, or 3-phospholene isomers thereof are suitable from the viewpoints of high yield and other factors.

The thermosetting resin of the present invention is obtained by producing polycarbodiimide from one or more kinds of organic polysocyanate by using the catalyst for accelerating the carbodiimidization of isocyanate and then subjecting the polycarbodiimide to crosslinking reaction with one or more kinds of crosslinking agent having two or more active hydrogen groups in their molecules, and has high thermal resistance, high strength, and excellent processability.

Though polycarbodiimide itself which originated in organic polyisocyanates is known (T. W. Campbell and J. J. Mongale, J. Amer. Soc., 84, 1493(1962)), it has been known that if the molecular weight of polycarbodiimide is controlled so as to have processability as plastic, the resin becomes rigid and fragile.

This is the reason why polycarbodiimide, in general, cannot be solely utilized as fine resin or foam, and its application is limited to that of stabilizer of polymer which employs the reactivity of a carbodiimide bond (for example, Stabaxol P [trade name] produced by Bayer Co. Ltd.).

In the production of polyurethane foam, partial introduction of the polycarbodiimide bond has previously been attempted for the purpose of increasing its thermal stability, but the product obtained was not substantially a polycarbodiimide resin.

The above-described thermosetting resin of the present invention may be produced by two methods, as described below.

One of the methods of the present invention consists of preparing a composition containing the above-described elements of the thermosetting resin of the present invention in a suitable ratio and then heating it at a suitable temperature. In this method, when organic polyisocyanate is firstly substantially changed into polycarbodimide in the presence of the carbodimidization catalyst, the crosslinking agent having the active hydrogen groups in its molecule coexists, but it is thought that if the crosslinking agent used in the present invention has very low reactivity with organic polyisocyanate, carbodiimidization progresses predominantly in the presence of the above-described catalyst and thus no problem occurs in the process thereof.

Therefore, if the crosslinking agent is reacted with organic polyisocyanate before carbodiimidization of organic polyisocyanate, it does not function as the crosslinking agent and it introduces thermally weak bonds, and thus it is desirable in principle that the active hydrogen groups of the crosslinking agent have as low an activity as possible with the respect to organic polyisocyanate in order that carbodiimidization may be conducted in a system in which organic polyisocyanate and the crosslinking agent coexist (consequently, it is difficult to conduct carbodimidization, for example, in a system in which 4,4'-diamino-diphenylmethane coexists).

Since carbonic acid gas is produced with the progress of carbodimidization reaction, if a foam is desired as a final product, the produced carbonic acid gas may be dispersed and held in the system, and if necessary, a foam stabilizer such as polyalkoxysilicone may be added.

In addition, fibrous reinforcement or powder or crystalline filler may be added in this stage.

It is unnecessary to complete the carbodiimidization in this stage. When the carbodiimidization has progressed to some extent, the system becomes solidified and changes into a resinous substance in which the remaining isocyanate may be observed, the substance being seen to be comparatively stable with almost no change occurring over several days to several weeks or more.

The solified resinous substance can be changed into a final cured substance by heating at a temperature above 100° C. and below 500° C., preferably at a temperature above 150° C. and below 400° C., and a cured substance of a desired shape can be obtained by heating within a suitable mold and under pressure, but this hot-pressing molding is performed at a temperature above 100° C. and below 500° C., preferably at a temperature within the range of 150° C. to 400° C., because the resinous substance is softened at a temperature above 150° C. and is then rapidly cured.

If necessary, the resinous substance may be ground for use, or it may be mixed with fibrous reinforcement or powder or crystalline filler after being ground.

The other method of the present invention is as follows. First, organic polyisocyanate is substantially changed into polycarbodiimide in the precence of a catalyst for accelerating carbodiimidization of isocyanate and then is mixed with the above described crosslinking agent having two or more active hydrogen groups. In this method, the crosslinking agent, for example, may be dispersedly mixed with the resinous substance produced by carbodiimidization of organic polyisocyanate.

Therefore, since organic polyisocyanate is substantially changed into polycarbodiimide, the present invention may effectively employ a crosslinking agent having high reactivity with organic polyisocyanate.

In either of the methods, when the resinous substance has remaining isocyanate groups to any extent, the resin can again be foamed by heating, and at this time, a cured substance of a desired shape can be formed by filling a mold by means of foaming.

The thermosetting resin of the present invention is obtained by reaction between polycarbodiimide and the crosslinking agent having the active hydrogen groups as described above, and is principally characterized by high strength and thermal resistance.

That is to say, a comparison of one example of the resin of the present invention (obtained in Embodiment 1 described hereinafter) with the resin obtained by the above described prior invention is shown in the below table.

|  | Specific gravity | Critical oxygen index | Flexural strength kg/cm$^2$ |
| --- | --- | --- | --- |
| Resin of Embodiment 1 | 1.18 | 52 | 165 |
| Resin of Prior Invention | 1.16 | 44.5 | 98 |

The resin of the present invention has excellent thermal stability and thermogravimetric analysis shows a rapid decrease in weight of the above described polytetrazole at about 250° C., while the resin of the present invention shows almost no decrease in weight up to 400° C. in the atmosphere, as shown in FIG. 1. On the other hand, in the prior invention of the inventors of the present invention, organic polyisocyanate is mixed with aminotriazine and next heated at a temperature of 60° to 160° C. to obtain a cured substance, and then this cured substance is again softened by heating it at a temperature of 300° to 400° C. and foamed to obtain a resin having high thermal resistance. Therefore, the processing is comparatively difficult because of the necessity for a process with two steps, the finally heating temperature of above 300° C., and the large amount of carbonic acid gas produced. The method of the present invention is able to easily produce the resin of the present invention having excellent properties as described above, because it is possible with this method to keep the heating temperature at a low level.

Furthermore, one of the methods of the present invention has the advantage that the process has one step and the crosslinking agent can be completely uniformly mixed with the resin, while the other method has the advantage that the crosslinking agent can be effectively used even if it has high reactivity with organic polyisocyanate.

DETAILED DESCRIPTION OF THE PREFERRED EMBODIMENTS

Embodiments of the present invention will be described hereinafter.

(1) 125 g of 4,4'-diphenylmethane diisocyanate was sufficiently mixed with 7 g of 2,4,6-triamino-s-triazine by a high speed mixer and 0.2 g of 3-methyl-1-phenyl-pholene-1-oxide was added to the mixture.

When the mixture was heated at 130° C., it gradually foamed and produced a coarse foam colored light yellow after two hours.

This foam was ground by an impact grinder and then molded at 230° C. under a pressure of 50 kg/cm$^2$ for 5 minutes, the obtained substance showing the following physical properties.

| Density | 1.18 g/cm$^3$ |
| --- | --- |
| Flexural strength | 172 kg/cm$^2$ |
| Critical oxygen index | 40 |
| Water absorption | 0.3% (boiling for 2 hours) |
| Decrease in weight up to 400° C. | 3% (temperature rise speed 5° C./min) |

(2) 125 g of 4,4'-methylenediphenyl diisocyanate was sufficiently mixed with 17 g of 2,4,6-triamino-s-triazine with a high-speed mixer. and then 0.2 g of 3-methyl-1-phospholene-1-oxide was added to the mixture. The mixture was processed in the same manner as Embodiment 1 to obtain a yellow foam. This foam was cut into a rectangular parallelepiped of 10 cm × 10 cm × 2 cm and then molded in a mold at 230° C. under a pressure of 50 kg/cm² for 5 minutes to obtain a yellow molded product. The physical properties of this product were as follows.

| Density | 1.25 g/cm³ |
|---|---|
| Flexural strength | 186 kg/cm² |
| Critical oxygen index | 45 |
| Water absorption | 0.3% (boiling for 2 hours) |
| Decrease in weight up to 400° C. | 2% |

(3) A yellow foam was obtained from 143 g of liquid MDI (partially-carbodiimidized isocyanate, Kasei Upjohn Co. Ltd. 143L), 6 g of 2,4,6-triamino-s-triazine and 0.15 g of 3-methyl-1-phenylphospholene-1-oxide in the same manner as Embodiment 1. The properties of the foam obtained were very similar to those obtained in Embodiment 1. (4) A reddish brown foam was obtained in the same manner as Embodiment 3 except that 2-phenyl-4,6-diamino-s-triazine was used instead of 2,4,6-triamino-s-triazine. This foam was ground and then molded at 230° C. under 50 kg/cm² for 5 minutes. The properties of the resin obtained were as follows.

| Density | 1.23 g/cm³ |
|---|---|
| Flexural strength | 158 kg/cm² |
| Critical oxygen index | 38 |
| Water absorption | 0.3% |
| Decrease in weight up to 400° C. | 5% |

(5) 125 g of 4,4'-diphenylmethane diisocyanate, 10 g of 2,4,6-triamino-s-triazine and 2 g of silicone surfactant (produced by Toray Silicone Co. Ltd., CF-2080) were sufficiently mixed with a high-speed mixer and 0.15 g of 3-methyl-1-phenyl-phospholene-1 -oxide was then added to the mixture. This mixture was gradually foamed by heating it at 130° C. for 2 hours to obtain a rigid yellow foam which consisted of fine cells. The density of the foam was 0.06 g/cm³ and maintained its strength with no deformation when heated up to 200° C. in the atmosphere.

(6) 50 g of the mixture obtained in Embodiment 5 was impregnated in a glass fiber strand mat and was then heated at 100° C. for 3 hours to obtain a glass-fiber-reinforced foam.

This glass-fiber-reinforced foam was molded at 230° C. under a pressure of 50 kg/cm² for 5 minutes to obtain a glass-fiber-reinforced molded product. The physical properties of this reinforced product were as follows.

| Density | 1.68 g/cm³ |
|---|---|
| Flexural strength | 3500 kg/cm² |
| Critical oxygen index | 48 |
| Charpy impact strength | 25 kg-cm < |

(7) The glass-fiber-reinforced foam obtained in Embodiment 6 was molded at 380° C. under a pressure of 50 kg/cm² for 30 minutes to obtain a dark brown molded product. The physical properties of this molded product were as follows.

| Density | 1.65 g/cm³ |
|---|---|
| Flexural strength (at room temperature) | 3200 kg/cm² |
| Flexural modulus | 128,000 kg/cm² |
| Flexural strength (at 150° C.) | 3320 kg/cm² |
| Flexural modulus (at 150° C.) | 130,000 kg/cm² |

(8) 125 g of 4,4'-diphenylmethane diisocyanate, 10 g of 4,4'-isoprophylidene-diphenol and 0.2 g of 3-methyl-1-phenylphospholene-1-oxide were mixed with a high-speed mixer, and the mixture obtained was gradually foamed by heating it at 100° C. to obtain a foam which comprised white fine cells and had slight flexibility. The density of this foam was 0.03 g/cm³.

When this foam was put in a mold and gradually compressed, a foam with a higher density was obtained. The foam was compressed so as to have a density of 0.1 g/cm³ and maintained its strength without almost any deformation when heated upto 200° C.

(9) 125 g of 4,4'-methylenediphenyl diisocyanate was mixed with 0.1 g of 3-methyl-1-phenyl-2-phospholene-1-oxide and heated at 130° C. for 3 hours to obtain a white foam. This foam was ground and then mixed with 7 g of 2,4,6-triamino-s-triazine in a ball mill for 24 hours to produce a powder molding material. This molding material was molded at 230° C. under a pressure of 50 kg/cm² for 5 minutes. The physical properties of the molded product obtained were almost the same as those obtained in Embodiment 1.

(10) 31.25 g of 4,4'-diphenylmethane diisocyanate, 2.98 g of phenylisocyanate and 1.71 g of 2,4-diamino-6-phenyl-s-triazine were dissolved in 150 ml of dioxane, and 0.08 g of 3-methyl-1-phenylphospholene-1-oxide was added to the solution. The solution was heated under agitation at 80° C. for 2 hours, then poured into 1,000 ml of hexane to precipitate a white powder and white powder filtered off.

This white powder was subjected to press molding at 200° C. to obtain a yellow molded product.

The physical properties of this product were as follows.

| Density | 1.21 g/cm³ |
|---|---|
| Flexural strength | 247 kg/cm² |
| Critical oxygen index | 54 |
| Thermogravimetry | |
| Decrease in weight up to 400° C. | 2% |
| Decrease in weight up to 800° C. | 27% |

(11) 112.5 g of 4,4'-diphenylmethane diisocyanate, 8.7 g of tolylene diisocyanate, 10.72 g of phenylisocyanate, 1.47 g of dimethylphenyl isocyanate, 3.1 g of 2,4,6-triamino-1,3,5-s-triazine, 15.0 g of 2,4-diamino-6-phenyl-s-triazine, 0.15 g of 3-methyl-1-phenyl-2-phospholene-1-oxide and 0.05 g of 3-methyl-1-phenyl-3-phospholene-1-oxide were mixed under agitation for 5 minutes.

Then, the mixture obtained was heated at 100° C. for 2 hours to obtain a light yellow foam.

This foam was subjected to press molding at 200° C. to obtain a yellow molded product.

The properties of this product were as follows.

| Density | 1.19 g/cm³ |
|---|---|
| Flexural | 219 kg/cm² |

| | |
|---|---|
| Critical oxygen index | 53 |
| Thermogravimetry | |
| Decrease in weight up to 400° C. | 2% |
| Decrease in weight up to 800° C. | 31% |

(12) 31.25 g of 4,4'-diphenylmethane diisocyanate and 2.98 g of phenylisocyanate were dissolved in 150 ml of xylene and 0.08 g of 3-methyl-1-phenylphospholene-1-oxide was added to the xylene solution. The solution obtained was heated under agitation at 120° C. for 2 hours, then poured into 1,000 ml of hexane to precipitate a white powder, and filtered to obtain a white powder.

The physical properties of this powder were as follows.

| Thermogravimetry | |
|---|---|
| Decrease in weight up to 400° C. | 3% |
| Decrease in weight up to 800° C. | 28% |

(13) 2 g of the white powder obtained in Embodiment 12 was mixed with 0.4 g of 2,4,6-triamino-1,3,5-s-triazine and heated at 150° C. to obtain a yellow resin.

This resin was subjected to press molding at 200° C. to obtain a yellow molded product.

The physical properties of this product were as follows.

| | |
|---|---|
| Density | 1.21 g/cm$^3$ |
| Flexural strength | 250 kg/cm$^2$ |
| Critical oxygen index | 54 |
| Thermogravimetry | |
| Decrease in weight up to 400° C. | 2% |
| Decrease in weight up to 800° C. | 26% |

(14) 2 g of the white powder obtained in Embodiment 12 was mixed with 0.1 g of 2,4,6-triamino-1,3,5-s-triazine and then subjected to press molding to obtain a yellow molded product.

The physical properties of this product were as follows.

| | |
|---|---|
| Density | 1.20 g/cm$^3$ |
| Flexural strength | 228 kg/cm$^2$ |
| Critical oxygen index | 53 |
| Thermogravimetry | |
| Decrease in weight up to 400° C. | 2% |
| Decrease in weight up to 800° C. | 30% |

(15) 2 g of the white powder obtained in Embodiment 12 was mixed with 0.2 g of 4,4'-isopropylidenediphenol and then molded at 200° C. to obtain a white molded product.

The physical properties of this product were as follows.

| | |
|---|---|
| Density | 1.16 g/cm$^3$ |
| Flexural strength | 245 kg/cm$^2$ |
| Critical oxygen index | 56 |
| Thermogravimetry | |
| Decrease in weight up to 400° C. | 2% |
| Decrease in weight up to 800° C. | 24% |

(16) The physical properties of the product molded at 200° C. which comprised the white powder obtained in Embodiment 12 and glass cloth were as follows.

| | |
|---|---|
| Glass content | 40% |
| Density | 1.63 g/cm$^3$ |
| Flexural strength (at room temperature) | 8600 kg/cm$^2$ |
| Flexural modulus (at room temperature) | 170,000 kg/cm$^2$ |
| Flexural strength (at 150° C.) | 7,500 kg/cm$^2$ |
| Flexural modulus (at 150° C.) | 165,000 kg/cm$^2$ |
| Critical oxygen index | 57 |
| Charpy impact strength | 36 kg-cm < |

(17) 31.25 g of 4,4'-diphenylmethane diisocyanate, 2.98 g of phenylisocyanate and 0.08 g of 3-methyl-1-phenylphospholene-1-oxide were mixed and then heated at 100° C. for 2 hours to obtain a light yellow foam.

2 g of the substance obtained by grinding this foam was mixed with 0.4 g of 2,4,6-triamino-1,3,5-s-triazine and then subjected to press molding at 200° C. to obtain a yellow molded product.

The physical properties of this product were as follows.

| | |
|---|---|
| Density | 1.21 g/cm$^3$ |
| Flexural strength | 250 kg/cm$^2$ |
| Critical oxygen index | 54 |
| Thermogravimetry | |
| Decrease in weight up to 400° C. | 2% |
| Decrease in weight up to 800° C. | 26% |

(18) 200 g of a novolac resin powder having an average molecular weight of about 500 which was made of phenolformaldehyde was mixed in a ball mill for 4 hours with 40 g of methylenepolyphenyl polycarbodiimde having an average molecular weight of about 2,000 which terminated at phenylisocyanate end groups. The mixture was put in a mold heated at 180° C. and then heated for 10 minutes under a pressure of 5 kg/cm$^2$ to obtain a yellow cured resin.

The properties of this resin were as follows.

| | |
|---|---|
| Density | 1.28 g/cm$^3$ |
| Flexural strength | 205 kg/cm$^2$ |
| Decrease in weight up to 400° C. | 10% |
| Critical oxygen index | 52 |

(19) 100 g of a novolac resin powder having an average molecular weight of about 500 which was made of phenolformaldehyde was mixed in a ball mill for 4 hours with 100 g of polymethylene-polyphenylcarbodimide having an average molecular weight of about 2,000 which was terminated at phenylisocyanate end groups.

The mixture was put in a mold heated at 180° C. and then heated for 10 minutes under a pressure of 5 kg/cm² to obtain a yellow cured resin.

The physical properties of this resin were as follows.

| Density | 1.32 g/cm³ |
| --- | --- |
| Flexural strength | 219 kg/cm² |
| Decrease in weight up to 400° C. | 5% |
| Critical oxygen index | 56 |

(20) 40 g of a novolac resin powder having an average molecular weight of about 500 which was made of phenol-formaldehyde was mixed in a ball mill for 24 hours with 200 g of polymethylene-polyphenylcarbodiimde having an average molecular weight of about 2,000 which was terminated at phenylisocyanate end groups. The mixture was put in a mold heated at 180° C. and then heated for 10 minutes under a pressure of 5 kg/cm² to obtain a yellow cured resin.

The physical properties of this resin were as follows.

| Density | 1.29 g/cm³ |
| --- | --- |
| Flexural strength | 214 kg/cm² |
| Decrease in weight up to 400° C. | 3% |
| Critical oxygen index | 56 |

(21) 100 g of a novolac resin powder having an average molecular weight of about 800 which was made of phenol-formaldehyde and 100 g of polymethylenepolyphenylcarbodiimide having an average molecular weight of about 2,000 which was terminated at phenylisocyanate end groups were dissolved in 1,000 ml of N-methylpyrrolidone.

This solution was applied on a glass plate and the solvent was removed to form a film which was then heated at 300° C. for 5 hours. The qualities of the product obtained were as follows.

| Specific volume resistivity | 10¹⁶ (Ωcm) |
| --- | --- |
| Dielectric breakdown strength | 15 (KV/mm) |

(22) 10 g of a novolac resin powder having an average molecular weight of about 800 which was made of phenolformaldehyde was mixed in a ball mill with 10 g of polymethylene-polyphenylcarbodiimide having an average molecular weight of about 3,000 which was terminated at phenylisocyanate end groups.

The physical properties of the product molded at 200° C. which was made from this mixture and a glass cloth were as follows.

| Glass content | 40% |
| --- | --- |
| Density | 1.53 g/cm³ |
| Flexural strength | 8,300 kg/cm² |
| Flexural modulus | 152,000 kg/cm² |

(23) 30 g of polycarbodiimide having sealed ends (an average molecular weight of about 1,000) were sufficiently mixed with 0.3 g of diazabicycloundecene in a mortar. The obtained mixture was put in a mold heated at 150° C. for 5 minutes and then heated at 200° C. for 10 minutes under a pressure to obtain a yellow cured resin.

The physical properties of this resin were as follows.

| Density | 1.22 g/cm³ |
| --- | --- |
| Flexural strength | 3.22 kg/cm² |

(24) 10 g of polycarbodiimide having sealed ends (an average molecular weight of about 2,000) were dissolved in 100 ml of N-methyl-2-pyrrolidone under agitation and 0.2 g of p-dimethylamino phenol was added to this solution with further agitation for 5 minutes. The solution obtained was uniformly applied on a glass plate and heated at room temperature, next at 50° C. for 30 minutes, and then at 100° C. for 2 hours to obtain a tough transparent film. The infrared absorption spectrum of this film showed absorption at about 1630 cm⁻¹ which was thought to have resulted from the trimerized structure of polycarbodiimide.

(25) 100 g of polycarbodiimde having the sealed ends (an average molecular weight of about 2,500) was completely dissolved in 1000 ml of a mixed solvent of tetrahydrofuran-trichloroethylene (2:1) under vigorous agitation. After the solution was further agitated at room temperature for 30 minutes, 0.5 g of N,N', N"-tris(diethylaminopropyl)hexahydro-s-triazine was added to the solution which was agitated and then heated quietly. When the temperature in the system reached 50° C., the solution rapidly increased in its viscosity and then became a transparent gel substance. This gel substance was ground and dried to obtain a white powder.

A yellow resin molded product was obtained by subjecting 30 g of this white powder to press molding in a mold at 200° C. for 25 minutes.

The physical properties of this product were as follows.

| Density | 1.30 g/cm³ |
| --- | --- |
| Flexural strength | 354 kg/cm² |

(26) 500 g of polycarbodiimide having sealed ends (a number-average molecular weight of about 4,000), 150 g of potassium titanate and 1 g of potassium acetate were ground and mixed in a ball mill for one week.

100 g of the white powder obtained in such a manner was subjected to press molding in a mold at 210° C. for 45 minutes to obtain a yellow resin molded product.

The physical properties of this product were as follows.

| Density | 1.68 g/cm³ |
| --- | --- |
| Flexural strength | 602 kg/cm² |

(27) 100 g of polycarbodiimide having sealed ends (a number-average molecular weight of about 2,200) was sufficiently mixed with 1 g of diazabicycloundecene in a mortar. The obtained mixture was impregrated in 35 g of a glass-fiber strand mat maintained at 190° C. and was cooled to room temperature to obtain a glass-fiber-reinforced resin. This glass-fiber-reinforced resin was pressed at 230° C. for 5 minutes to obtain a reinforced molded product.

The physical properties of this product were as follows.

| | |
|---|---|
| Density | 1.71 g/cm³ |
| Flexural strength | 4200 kg/cm² |

(28) 100 g of polycarbodiimide having sealed ends (a number-average molecular weight of about 2,500), 1 g of diazabicyclooctane and 1.5 g of phenyl glycidyl ether were sufficiently mixed in a mortar. The obtained mixture was impregnated in a glass cloth and subjected to press molding at 200° C. for 5 minutes to obtain a reinforced molded product.

The physical properties of this product were as follows.

| | |
|---|---|
| Density | 1.37 g/cm³ |
| Flexural strength | 3800 kg/cm² |

(29) 100 g of polycarbodiimide having phenyl end groups (a number-average molecular weight of about 2500) was sufficiently mixed with phenyl glycidyl ether. The obtained mixture was subjected to press molding at 150° C. for 5 minutes to obtain a reinforced molded product.

The physical properties of this product were as follows.

| | |
|---|---|
| Density | 1.19 g/cm³ |
| Flexural strength | 450 kg/cm² |

(30) 100 g of polycarbodiimide having the p-tolyl end groups (a number-average molecular weight of about 2000) was sufficiently mixed with 100 g of a diglycidyl ether of bisphenol A and 1 g of diazabicyclooctane was added to the mixture. The obtained powder resin was subjected to press molding at 180° C. for 10 minutes to obtain a reddish yellow resin molded product.

The physical properties of this product were as follows:

| | |
|---|---|
| Density | 1.21 g/cm³ |
| Flexural strength | 474 kg/cm² |

(31) 125 g of 4,4'-diphenylmethane diisocyanate and 87 g of a mixture of 2,4- and 2,6-tolylene diisocyanate containing 65% of 2,4-tolylene diisocyanate were sufficiently mixed and then 0.2 g of 3-methyl-1-phenyl-2-phospholene-1-oxide was added to the mixture. The mixture obtained was heated at 120° C. for 2 hours to obtain a foam which was then ground by a ball mill for 48 hours. 35 g of novolac glycidyl ether of o-cresol (epoxy equivalent 210) was added to the ground foam and then mixed in a ball mill for 48 hours. The mixture obtained was heated at 100° C. for 5 minutes and then subjected to press molding at 200° C. for 10 minutes to obtain a dark red resin molded product.

The physical properties of this product were as follows:

| | |
|---|---|
| Density | 1.23 g/cm³ |
| Flexural strength | 483 kg/cm² |

(32) 140 g of coarse methylenediphenyl diisocyanate, 50 g of phenyl isocyanate, 30 g of phthalic acid diglycidyl ether (epoxy equivalent 140), 0.2 g of 3-methyl-1-ethyl-2-phospholene-1-oxide were sufficiently mixed and then heated at 120° C. for 1 hour to obtain a resinous foam. 100 g of this foam was mixed in a ball mill for 24 hours with 30 g of potassium carbonate and the mixture obtained was subjected to press molding at 180° C. for 15 minutes to obtain a resin-cured molded product.

The physical properties of this product were as follows:

| | |
|---|---|
| Density | 1.50 g/cm³ |
| Flexural strength | 610 kg/cm² |

(33) 87 g of a mixture of 2,4- and 2,6-tolylene diisocyanate containing 80% of 2,4-tolylene diisocyanate, 20 g of phenyl isocyanate, 22 g of p-tolyl isocyanate, 7.5 g of N-diglycidyl aniline (epoxy equivalent 90), and 0.1 g of 3-methyl-1-ethyl-2-phospholene-1-oxide were sufficiently mixed and then heated at 130° C. for 1.5 hours. After 100 g of the resinous foam obtained was ground with a ball mill for 24 hours, 1 g of tris(dimethylamino)-phenol was added to the ground foam and was further mixed for 12 hours. 20 g of the powder resin obtained was subjected to press molding at 200° C. for 7 minutes to obtain a dark red molded product.

The physical properties of this product were as follows:

| | |
|---|---|
| Density | 1.20 g/cm³ |
| Flexural strength | 443 kg/cm² |

(34) 100 g of polycarbodiimide (a number-average molecular weight of about 3000) having phenyl end groups was dissolved in 500 ml of N-methyl-2-pyrrolidone and 50 g of a diglycidyl ether dirivative of bisphenol A (epoxy equivalent 180) was added to the solution obtained. Immediately after the solution was made uniform, the solution was applied on a glass plate maintained at 50° C., allowed to stand 1 hour, and then heated up to 210° C. for 2 hours to obtain a transparent tough film.

The physical properties of this film were as follows:

| | |
|---|---|
| Tensile strength | 10.6 kg/cm² |
| Tensile elongation | 73% |

(35) 50 g of polycarbodiimide having phenyl end groups (a number-average molecular weight of about 800) was sufficiently mixed with 100 g of a diglycidyl ether derivative of bisphenol A (epoxy equivalent 180) to obtain a semisolid resin. This resin was impregnated in 50 g of a glass-fiber strand mat, then heated at 100° C. for 1 hour, and subjected to press molding at 200° C. for 5 minutes to obtain a glass-fiber-reinforced molded product.

The physical properties of this product were as follows:

| | |
|---|---|
| Density | 1.64 g/cm³ |
| Flexural strength | 3150 kg/cm² |

What is claimed is:

1. A thermosetting resin comprising the reaction product of a polycarbodiimide produced from the substantial conversion of at least one organic polyisocyanate in the presence of at least one catalyst capable of accelerating the carbodiimidization of isocyanate with at least one crosslinking agent having two or more active hydrogen groups in its molecules.

2. A thermosetting resin according to claim 1, in which said crosslinking agents are 2,4,6-triamino-1,3,5-striazine or 2,4-diamino-6-phenyl-1,3,5-striazine.

3. A thermosetting resin according to claim 1, in which said crosslinking agents are 4,4'-isopropylidenediphenol or its derivatives.

4. A thermosetting resin according to claim 1, in which said crosslinking agent is 4,4'-isopropylidene diphenol.

5. A thermosetting resin comprising the reaction product of a polycarbodiimide produced from the substantial conversion of at least one organic polyisocyanate in the presence of at least one catalyst capable of accelerating the carboiimidization of isocyanate with at least one compound having one or more epoxy groups in its molecules.

6. A thermosetting resin according to claim 5, in which said compound having epoxy groups in its molecules are glycidyl ethers, glycidyl esters, or glycidyl amines.

7. A thermosetting resin having high thermal resistance comprising the reaction product of a polycarbodiimide produced from the substantial conversion of at least one organic polyisocyanate in the presence of at least one catalyst capable of accelerating the carbodiimidization of isocyanate with at least compound capable of accelerating the trimerization reaction of the carbodiimide.

8. A thermosetting resin according to claim 7 obtained by reacting polycarbodiimide with said compounds capable of accelerating the trimerization reaction of carbodiimide at a temperature above 100° C. and below 300° C.

9. A thermosetting resin according to claim 7 or 8, in which said compounds capable of accelerating the trimerization reaction of carbodiimide are the same as the trimerization catalyst of organic isocyanate.

10. A thermosetting resin according to claim 7, in which said compound capable of accelerating the trimerization reaction of carbodiimide has at least one tertiary nitrogen atom in its molecules.

11. A thermosetting resin according to claim 7, in which said compound capable of accelerating the trimerization reaction of carbodiimide is selected from the group consisting of diazabicycloundecene, tris(dialkylaminoalkyl)-hexahydro-s-triazine, organic or inorganic acid salts and mixtures thereof.

12. A thermosetting resin according to claim 9, in which said compounds capable of accelerating the trimerization reaction of carbodiimide are metal salts of an organic acid.

13. A thermosetting resin according to claim 9, in which said compounds capable of accelerating the trimerization reaction of carbodiimide are mixed systems of a tertiary amine and an alkylene oxide.

14. A method of producing a thermosetting resin comprising the steps of producing polycarbodiimide by substantially converting at least one organic polyisocyanate in the presence of one or more kinds of catalyst for accelerating the carbodiimidization of isocyanate, mixing said polycarbodiimide with at least one crosslinking agent having two or more active hydrogen groups in its molecules, and heating this composition at a suitable temperature of from 100° C. to 300° C.

15. A method according to claim 14, in which said crosslinking agents are aminotriazine or its derivatives.

16. A method according to claim 14, in which said crosslinking agents are 4,4'-isopropylidene diphenol or its derivatives.

17. A method according to claim 14, in which said crosslinking agents are 4,4'-diaminodiphenylmethane or its derivatives.

18. A method according to claim 14, in which said crosslinking agents are 2,4,6-triamino-1,3,5-striazine or 2,4-diamino-6-phenyl-1,3,5-striazine.

19. A method according to claim 14, in which said crosslinking agent is 4,4-isopropylidene diphenol.

20. A method of producing a thermosetting resin comprising the steps of producing polycarbodiimide by reacting at least one organic polyisocyanate in the presence of one or more kinds of catalyst for accelerating the carbodiimidization of isocyanate, mixing said polycarbodiimide with at least one compound having epoxy groups in its molecules, and heating said composition comprising said polycarbodiimide and said compound having epoxy groups in its molecules at a suitable temperature of from 100° C. to 300° C.

21. A method of producing a thermosetting resin according to claim 20, in which said compounds having epoxy groups in their molecules are mono-functional epoxy compounds, glycidyl ethers, glycidyl esters, or glycidyl amines.

22. A method of producing a thermosetting resin according to claim 20 comprising reacting polycarbodiimide substantially produced from one or more kinds of organic polyisocyanate by using one or more kinds of catalyst for accelerating the carbodiimidization of isocyanate with the compounds having epoxy groups in their molecules in the presence of one or more kinds of compounds having at least one tertiary nitrogen atom in their molecules.

23. A method of producing a thermosetting resin according to claim 20, in which said compounds having at least one tertiary nitrogen atom in their molecules are diazabicyclooctane, benzylmethyl amine, dimethylamino phenol, or pentaalkyldiethylene triamine.

24. A method of producing a thermosetting resin according to claim 20 comprising heating a composition containing one or more kinds of organic polyisocyanate, one or more kinds of catalyst for accelerating carbodiimidization of isocyanate, and one or more kinds of compounds having epoxy groups in their molecules in the presence of compounds having at least one tertiary nitrogen atom in their molecules.

25. A method of producing a thermosetting resin according to claim 20, in which said compound having epoxy groups in its molecules are glycidyl ethers, glycidyl esters, or glycidyl amines.

26. A method of producing a thermosetting resin according to claim 24, in which said compounds having at least one tertiary nitrogen atom in their molecules are diazabicyclooctane, benzyldimethyl amine, dimethyl amino phenol, or pentaalkyldiethylene triamine.

27. A method of producing a thermosetting resin comprising the steps of heating a composition containing polycarbodiimide produced from the substantial conversion of at least one organic polyisocyanate in the presence of at least one catalyst capable of accelerating the carbodiimidization of isocyanate and a novolac phenolic resin at a suitable temperature of from 100° C. to 300° C.

* * * * *